(12) United States Patent
Kim et al.

(10) Patent No.: US 9,712,369 B2
(45) Date of Patent: Jul. 18, 2017

(54) METHOD AND APPARATUS FOR LOW-COMPLEXITY FREQUENCY DEPENDENT IQ IMBALANCE COMPENSATION

(71) Applicant: Samsung Electronics Co., Ltd., Gyeonggi-do (KR)

(72) Inventors: Jaeyoung Kim, San Diego, CA (US); Gennady Feygin, San Diego, CA (US); Pranav Dayal, San Diego, CA (US); Jungwon Lee, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/987,022

(22) Filed: Jan. 4, 2016

(65) Prior Publication Data

US 2017/0126465 A1    May 4, 2017

Related U.S. Application Data

(60) Provisional application No. 62/250,266, filed on Nov. 3, 2015.

(51) Int. Cl.
| | |
|---|---|
| *H03H 7/30* | (2006.01) |
| *H03H 7/40* | (2006.01) |
| *H03K 5/159* | (2006.01) |
| *H04L 27/38* | (2006.01) |
| *H04L 27/36* | (2006.01) |

(52) U.S. Cl.
CPC ........ *H04L 27/3863* (2013.01); *H04L 27/364* (2013.01)

(58) Field of Classification Search
CPC .......................... H04L 27/3863; H04L 27/364
USPC .......................................... 375/235, 296, 346
See application file for complete search history.

(56) References Cited

U.S. PATENT DOCUMENTS

| | | | |
|---|---|---|---|
| 8,509,298 B2 | 8/2013 | Hormis | |
| 2012/0099673 A1* | 4/2012 | Johansson | ............. H04L 27/364 375/296 |
| 2012/0106686 A1 | 5/2012 | Zhang et al. | |
| 2012/0263215 A1 | 10/2012 | Peng | |

* cited by examiner

*Primary Examiner* — Phuong Phu
(74) *Attorney, Agent, or Firm* — The Farrell Law Firm, P.C.

(57) ABSTRACT

Methods and apparatuses are provided in which a processor of a transceiver selects one of a real component of a complex signal and an imaginary component of the complex signal. The complex signal has IQ imbalance. An adaptive filter of the transceiver performs a real multiplication operation using an adaptive filter coefficient and the one of the real component and the imaginary component of the complex signal to generate a complex compensation signal. An adder of the transceiver sums the complex signal and the complex compensation signal to generate a compensated signal in which the IQ imbalance is corrected. The compensated signal is output for digital processing.

18 Claims, 6 Drawing Sheets

METHOD AND APPARATUS FOR LOW-COMPLEXITY FREQUENCY DEPENDENT IQ IMBALANCE COMPENSATION

PRIORITY

This application claims priority under 35 U.S.C. §119(e) to a U.S. Provisional Patent Application filed on Nov. 3, 2015 in the U.S. Patent and Trademark Office and assigned Ser. No. 62/250,266, the entire disclosure of which is incorporated herein by reference.

FIELD OF THE DISCLOSURE

The present disclosure relates generally to radio frequency (RF) transceivers, and more particularly, to methods and apparatuses for compensating frequency in-phase (I) quadrature (Q) imbalance in radio frequency transceivers.

BACKGROUND

Electronic systems that operate with RF signals may include an RF transceiver that processes a wireless or wired signal, for example, an RF signal. An RF transceiver may include various components to amplify and/or filter an RF signal to recover original data carried by the RF signal. An increased demand for low-cost and low-power architecture of wireless communication design has focused attention on direct conversion RF transceivers because they simply down-convert by removing intermediate frequency (IF) analog components. However, direct-conversion RF transceivers suffer from an imbalance between analog I and Q branches that arise from the imperfect analog front end (FE) components.

Imperfect IQ down-conversion may generate gain and phase imbalance between I and Q components. Gain mismatch may arise from unequal gains of a mixer, unequal gains for local oscillator (LO) drivers that supply an LO clock to the I and Q branches, unequal gains in variable gain amplifier (VGA) components of I and Q branches, and/or unequal least significant bit (LSB) levels of analog-to-digital converters (ADCs) in the I and Q branches. The phase imbalance primarily arises from a difficulty in achieving a precise 90 degree phase between I and Q clocks. Since these types of imbalance do not depend on signal frequency, they are referred to as a frequency-independent (FI) imbalance.

Analog baseband (ABB) filter pole position mismatch between analog I and Q paths may cause frequency-dependent (FD) IQ mismatch. The FI and FD IQ imbalance results in a mirror image signal in the signal bandwidth. A typical image rejection ratio (IRR) at the receive side ranges from 20 to 40 dB, which is insufficient to correctly receive high-order modulation carriers that require a high signal-to-noise ratio (SNR).

The principal approaches for estimating and compensating for IQ mismatch are a frequency-domain approach and a time-domain approach. The frequency-domain approach significantly reduces the complexity of IQ compensation when compared with the time-domain approach, due to a conversion of convolution operations into multiplication operations in the frequency domain. However, the frequency-domain approach requires special pilot patterns for IQ imbalance estimation, which reduces the spectral efficiency and available throughput due to the overhead of pilot insertion. Thus, the frequency-domain approach is not supported in wireless access network (WAN) standards, such as, for example, Long Term Evolution (LTE) and Wideband Code Division Multiple Access (WCDMA).

The time-division approach uses blind estimation by exploiting an orthogonal property of a received signal to compensate FI and FD mismatch. The time-domain approach does not require special pilot patterns to estimate IQ mismatch, which enables efficient utilization of a wireless channel.

SUMMARY

According to an aspect of the present disclosure, a method is provided in which a processor of a transceiver selects one of a real component of a complex signal and an imaginary component of the complex signal. An adaptive filter of the transceiver performs a real multiplication operation using an adaptive filter coefficient and the one of the real component and the imaginary component of the complex signal to generate a complex compensation signal. A compensated signal is generated based on summing, by an adder of the transceiver, the complex signal and the complex compensation signal.

According to another aspect of the present disclosure, an apparatus is provided that includes a processor configured to select one of a real component of a complex signal and an imaginary component of the complex signal. The apparatus also includes an adaptive filter configured to perform a real multiplication operation using an adaptive filter coefficient and the one of the real component and the imaginary component of the complex signal to generate a complex compensation signal. The apparatus also includes an adder configured to sum the complex signal and the complex compensation signal to generate a compensated signal.

BRIEF DESCRIPTION OF THE DRAWINGS

The above and other aspects, features and advantages of the present disclosure will be more apparent from the following description when taken in conjunction with the accompanying drawings, in which.

DETAILED DESCRIPTION OF EMBODIMENTS OF THE PRESENT DISCLOSURE

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

The terms and words used in the following description and claims are not limited to their dictionary meanings, but are merely used to enable a clear and consistent understanding of the invention. Accordingly, it should be apparent to those skilled in the art that the following description of embodiments of the present disclosure are provided for illustrative purposes only and not for the purpose of limiting the invention, as defined by the appended claims and their equivalents.

Although the terms including an ordinal number, such as first and second. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

It is to be understood that the singular forms "a," "an," and "the" include plural referents unless the context clearly dictates otherwise. Thus, for example, reference to "an identifier" includes reference to one or more such identifiers.

In the present disclosure, it should be understood that the terms "include" or "have" indicate existence of a feature, a number, a step, an operation, a structural element, parts, or a combination thereof, and do not exclude the existence or probability of additional one or more other features, numerals, steps, operations, structural elements, parts, or combinations thereof.

Figure 1:
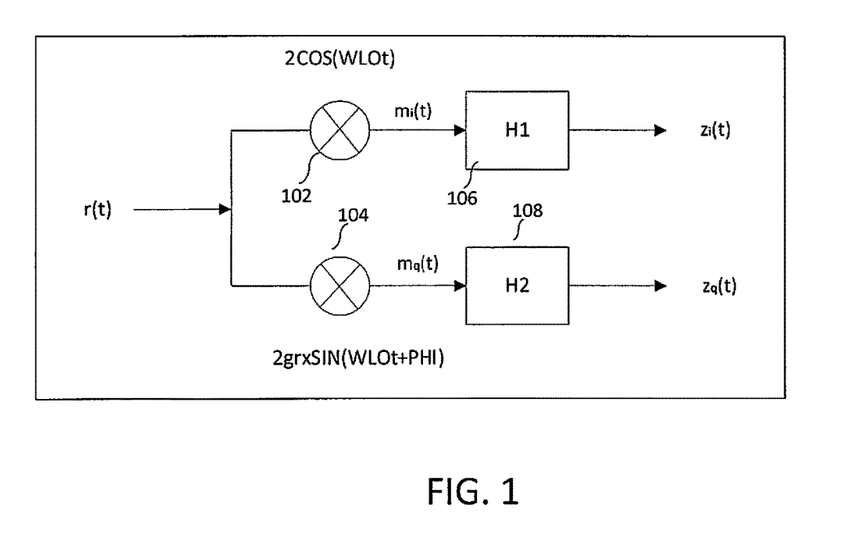
FIG. 1 is a diagram illustrating a receiver structure based on IQ down-conversion.

Referring initially to FIG. 1, a diagram illustrates a receiver structure based on IQ down-conversion. An RF signal r(t) is received and provided to both a first mixer 102 and a second mixer 104, which operate with a 90 degree phase offset for quadrature reception. The RF signal r(t) and a corresponding complex LO signal $x_{LO}^{Rx}(t)$ may be expressed as Equations (1) and (2) below, respectively.

$$r(t) = 2 \cdot \text{real}\{s(t)e^{j\omega_{LO}t}\} \quad (1)$$

$$x_{LO}^{RX}(t) = \cos(\omega_{LO}t) - jg\sin(\omega_{LO}t + \phi) \quad (2)$$
$$= K_1 e^{-j\omega_{LO}t} + K_2 e^{j\omega_{LO}t}$$

The coefficients $K_1$ and $K_2$ are expressed as Equation (3), where [g,φ] represents the effective amplitude and phase FI imbalance of the reception (RX) path. Additionally, $\omega_{LO}$ is the frequency of the LO, t is the time, and j is a constant equal to square root of −1 (sqrt(−1)). Further, s(t) is a complex baseband signal. Finally, $e^{j\omega_{LO}t}$ is a complex exponential.

$$K_1 = \frac{1 + ge^{-j\phi}}{2}, K_2 = \frac{1 - ge^{-j\phi}}{2} \quad (3)$$

The first mixer 102 mixes the received signal r(t) and a first local frequency signal $2^{\cos(\omega_{LO}t)}$ from the complex LO signal $x_{LO}^{Rx}(t)$ resulting in a first down-converted signal $m_i(t)$. The second mixer 104 mixes the received signal r(t) and a second local frequency signal $2g_{rx}^{\sin(\omega_{LO}t+\phi)}$ from the complex LO signal $x_{LO}^{Rx}(t)$, resulting in a second down-converted signal $m_q(t)$, where $g_{rx}$ is the gain of the RX chain on the second branch of the circuit, and is positive but, in general, not equal to one. The down-converted signal m(t) may be expressed as Equation (4) below, in which high-order frequency components are ignored.

$$m(t) = r(t) \cdot x_{LO}^{Rx}(t) = K_1 s(t) + K_2 s^*(t) \quad (4)$$

The first and second down-converted signals $m_i(t)$ and $m_q(t)$ are provided to first and second low pass filters $h_1(t)$ 106 and $h_2(t)$ 108, respectively. After passing through the first and second low pass filters $h_1(t)$ 106 and $h_2(t)$ 108, a real component $z_i(t)$ of a complex baseband signal z(t) and an imaginary component $z_q(t)$ of the complex baseband signal z(t) are provided. The complex baseband signal z(t) may be expressed as set forth in Equation (5) below, where m*(t) is a conjugate of m(t).

$$z(t) = m_i(t) * h_1(t) + jm_q(t) * h_2(t) \quad (5)$$
$$= \frac{m(t) + m^*(t)}{2} * h_1(t) + j\frac{m(t) - m^*(t)}{2j} * h_2(t)$$
$$= g_1(t) * s(t) + g_2(t) * s(t)^*$$

A combined response of FI and FD is expressed as Equation (6) below. $g_1(t)$ and $g_2(t)$ are complex scaling factors for s(t) and s*(t).

$$g_1(t) = \frac{1}{2}(h_1(t) + g_{rx}e^{-j\theta}h_2(t)) \quad (6)$$
$$g_2(t) = \frac{1}{2}(h_1(t) - g_{rx}e^{-j\theta}h_2(t))$$

If there is no mismatch between $h_1(t)$ and $h_2(t)$ (i.e., $h_1(t)$ and $h_2(t)$ are equal to h(t)), $g_1(t)$ and $g_2(t)$ are reduced to $h(t)K_1$ and $h(t)K_2$. In such a case, there is no frequency-dependent IQ mismatch and IQ mismatch reduces frequency independent.

In the frequency domain, the Fourier transform of Equation (5) may be expressed as Equation (7) below. $G_1(f)$, $G_2(f)$, and S(f) are Fourier transforms of $g_1(t)$, $g_2(t)$, and s(t).

$$Z(f) = G_1(f)S(f) + G_2(f)S(-f)^* \quad (7)$$

The corresponding mirror-frequency attenuation $L_{RX}$ (or IRR), may be expressed as Equation (8) below.

$$L_{RX} = 10\log_{10}\frac{|G_1(f)|^2}{|G_2(f)|^2} = 10\log_{10}\frac{|H_1(f) + g_{rx}e^{-j\theta}H_2(f)|^2}{|H_1(f) - g_{rx}e^{j\theta}H_2(f)|^2} \quad (8)$$

If $H_1(f)$ is equal to $H_2(f)$, Equation (8) is reduced to $$10\log_{10}\frac{|K_1|^2}{|K_2|^2},$$

which is the expression for IRR of FI imbalance. The typical range for 25-40 dB IRR is 1-5 percent gain mismatch and 1-5 degrees of phase mismatch. However, image suppression with more than 40 dB is needed to support high-order modulated carriers, such as, for example, 256QAM in LTE.

Figure 2:
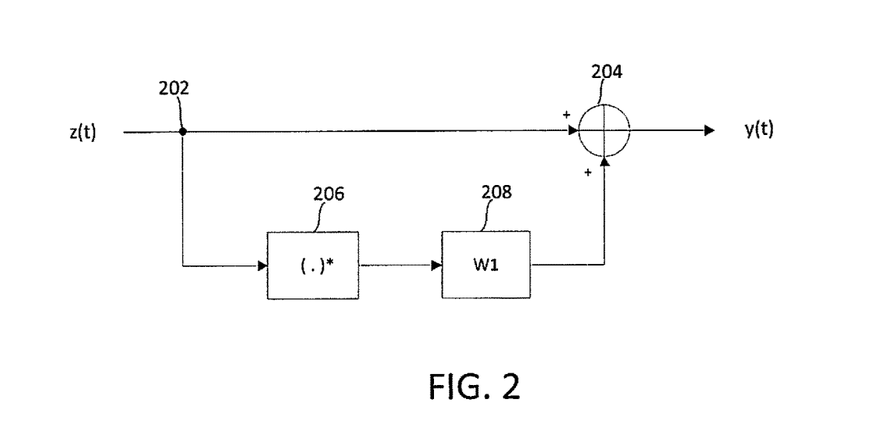
FIG. 2 is a diagram illustrating a filter compensation model.

Referring now to FIG. 2, a diagram illustrates a filter compensation model. Specifically, the filter model of FIG. 2 may compensate IQ FD imbalance. The complex baseband signal z(t) from FIG. 1 is provided as input to the filter compensation model. Specifically, the complex baseband signal z(t) is provided to a first node 202. From the first node 202, the complex baseband signal z(t) is provided to both an adder 204 and a conjugation block 206. The conjugation block 206 is configured to change the polarity of the imaginary part of the complex baseband signal z(t), thereby generating a complex conjugate signal.

The complex conjugate signal is provided from the conjugation block 206 to an adaptive filter 208. The adaptive filter 208 may be a finite impulse response (FIR) filter, which is a type of discrete-time filter. The adaptive filter 208 is configured to perform a complex convolution operation on the complex conjugate signal with an adaptive filter coefficient, to generate a complex compensation signal.

The adaptive filter 208 provides the complex compensation signal to the adder 204. The adder 204 adds the complex compensation signal to the complex baseband signal z(t), and outputs a compensated signal y(t). The compensated signal y(t) may be expressed as Equation (9) below, where $z^*(t)$ is a conjugate of z(t) and w(t) is an adaptive filter coefficient.

$$y(t)=z(t)+w1(t)*z^*(t) \quad (9)$$

When z(t) from Equation (5) is substituted into Equation (9), the result is Equation (10) below, where $g_1^*(t)$ is a conjugate of $g_1(t)$, $g_2^*(t)$ is a conjugate of $g_z(t)$, and $s^*(t)$ is a conjugate of s(t).

$$y(t)=(g_1(t)+w1(t)*g_2^*(t))*s(t)+(g_2(t)+w1(t)*g_1^*(t))*s^*(t) \quad (10)$$

Thus, an optimal complex compensation signal that cancels output a mirror image, and makes $g_2(t)+w1(t)*g_1^*(t)$ equal to zero, is expressed as Equation (11) below.

$$W1_{OPT}(f) = -\frac{G_2(f)}{G_1^*(-f)} \quad (11)$$

The filter compensation model of FIG. 2 suggests a Newton method for adaptation of filter taps. The only property that may be used for time-domain adaptation is a properness condition. For FD IQ imbalance, the conditions for adaptation may be expressed as shown in Equation (12) below.

$$c_y(\tau)=E\{y(t)y(t-\tau)\}=0, \text{ for } 0\leq\tau\leq\tau_{max} \quad (12)$$

where y(t) is a compensated signal, y(t−τ) is a delayed compensated signal, τ is a delay time and $c_y(\tau)$ is a circular correlated signal.

In Equation (12), $\tau_{max}$ is a system parameter that determines the number of filter taps. The objective function is $C_y=E\{Y(t)y(t)\}$, where $Y(t)=[y(t)y(t-1)\ldots y(t-N+1)]^T$, and N is the number of filter coefficients derived from $\tau_{max}$. The approximate Newton method to find filter coefficients to satisfy $C_y=0$, in which α is a step size of each update, is expressed in Equation (13) below.

$$w(n+1)=w(n)-\alpha Y(t)y(t) \quad (13)$$

where w(n) is a complex-valued vector of the filter coefficient. w(n) is updated using the compensated signal vector Y(t) as illustrated in Equation (13).

Figure 3:
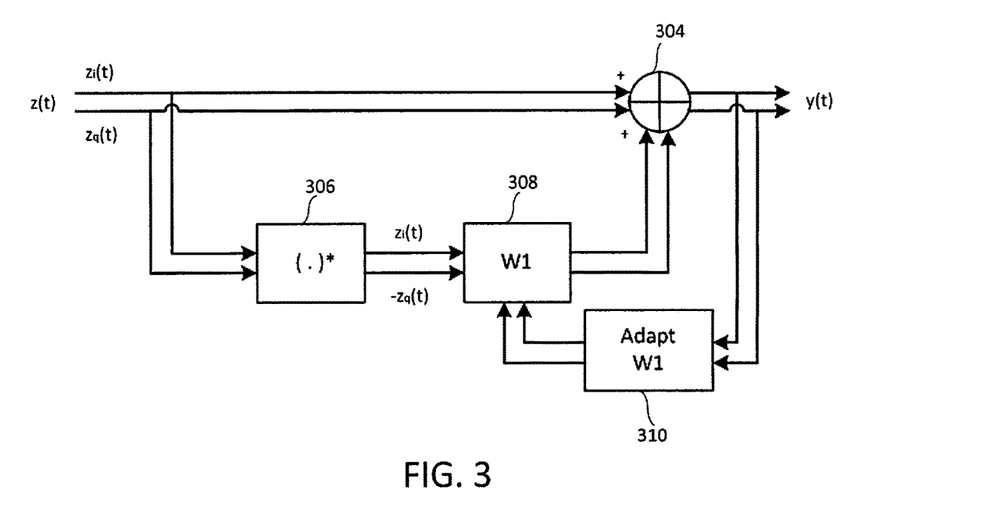
FIG. 3 is a diagram illustrating a filter compensation model with filter adaptation.

Referring now to FIG. 3, a diagram illustrates a filter compensation model with filter adaptation. Specifically, the model of FIG. 3 illustrates the model of FIG. 2 in greater detail. The complex baseband signal z(t) from FIG. 1 is provided as input to the filter compensation model as real and imaginary components, $z_i(t)$ and $z_q(t)$, respectively. The components $z_i(t)$ and $z_q(t)$ are provided to both an adder 304 and a conjugation block 306. The conjugation block 306 is configured to change the polarity of the imaginary component $z_q(t)$, thereby generating a complex conjugate signal with components, $z_i(t)$ and $-z_q(t)$.

The complex conjugate signal is provided from the conjugation block 306 to an adaptive filter 308. The adaptive filter 308 may be a FIR filter, which is a type of discrete-time filter. The adaptive filter 308 is configured to perform a complex convolution operation on the complex conjugate signal with an adaptive filter coefficient that is outputted by a filter adaptation block 310 to generate a complex compensation signal.

The adaptive filter 308 provides the complex compensation signal to the adder 304. The adder 304 adds the complex compensation signal to the complex baseband signal z(t), and outputs a compensated signal y(t). The compensated signal y(t) is provided to the filter adaptation block 310, which generates the adaptive filter coefficient that is provided to the adaptive filter 308. The adaptive filter coefficient is used by the adaptive filter 308 to generate the complex compensation signal. Thus, the adaptive filter may be iteratively updated in accordance with Equation (13).

The time-domain adaptive filter architecture, as illustrated in FIGS. 2 and 3, increases hardware complexity and power consumption since IQ compensation requires extremely high resolution of parameter updates for stability. Accordingly, a high resolution complex multiplier is required at both the adaptation and filter states.

Figure 4:
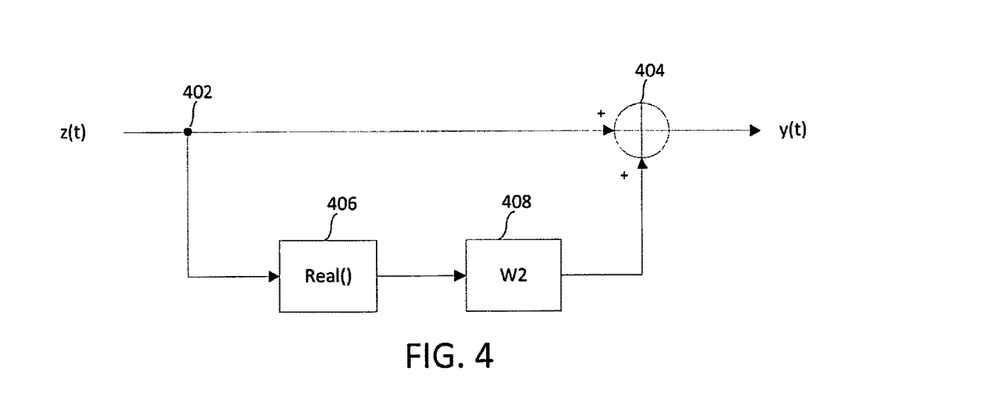
FIG. 4 is a diagram illustrating a filter compensation model using a real component of a complex signal, according to an embodiment of the present disclosure.

Referring now to FIG. 4, a diagram illustrates a filter compensation model using a real input of a complex signal, according to an embodiment of the present disclosure. The complex baseband signal z(t) from FIG. 1 is provided as input to the filter compensation model. Specifically, the complex baseband signal z(t) is provided to a first node 402. From the first node 402, the complex baseband signal z(t) is provided to both an adder 404 and a selector block 406. The selector block 406 is configured to select the real component of the complex baseband signal z(t).

The real component of the complex baseband signal z(t) is provided from the selector block 406 to an adaptive filter 408. The adaptive filter 408 may be an FIR filter, which is a type of discrete-time filter. The adaptive filter 408 is configured to perform a real multiplication operation using the real component of the complex baseband signal z(t) and an adaptive filter coefficient to generate a complex compensation signal.

The adaptive filter 408 provides the complex compensation signal to the adder 404. The adder 404 adds the complex compensation signal to the complex baseband signal z(t), and outputs a compensated signal y(t).

By using the real component of the complex baseband signal z(t) instead of the complex conjugate signal (as shown in FIGS. 2 and 3), the complex multiplication of the frequency dependent IQ compensation is reduced to real multiplication. Consequently, hardware complexity in the filtering stage is reduced by at least half. Due to the reduced hardware complexity, the power that is consumed in each filtering operation is reduced. Despite the reduced complexity and power consumption, there is no loss in performance, as described in greater detail below.

It is possible to determine whether the optimal weight exists, in the embodiment of the present disclosure shown in FIG. 4, using the derivation of Equations (14)-(16) below.

$$y(t) = z(t) + w2(t) * \text{real}\{z(t)\} = z(t) + w2(t) * \frac{(z^*(t) + z(t))}{2} \quad (14)$$

$$y(t) = \left(g_1(t) + \frac{1}{2}w2(t) * (g_2^*(t) + g_1(t))\right) * s(t) + \quad (15)$$

$$\left(g_2(t) + \frac{1}{2}w2(t) * (g_1^*(t) + g_2(t))\right) * s^*(t)$$

$$W2_{OPT}(f) = -\frac{2G_2(f)}{G_1^*(-f) + G_2(f)} \quad (16)$$

Equation (15) is derived by substituting Equation (5) into Equation (14). Equation (16) is derived by from the Fourier transform of Equation (15), where $(G_12(f)+\frac{1}{2} w2(t)*(G_11^{'*}(-f)+G_12(f))$ is set equal to zero. Since the optimal weight is a complex filter coefficient and Equation (16) is a realizable transfer function by FIR architecture, an optimal weight exists that satisfies Equation (16).

When Equation (16) is compared with Equation (11), the optimal weight for embodiments of the present disclosure shown in FIG. 4 estimates an average of $G_1^*(-f)$ and $G_2(f)$, instead of $G_1^*(-f)$ in the denominator term. Usually, $G_2(f)$ is much weaker than $G_1^*(-f)$ (at least 20 dB) and, therefore, the optimal weight $W2_{OPT}(f)$ is approximately equal to $2W1_{OPT}(f)$.

When using the real component of the complex baseband signal in embodiments of the present disclosure, there is no loss of information needed for IQ imbalance compensation as compared with using the conjugate input. The main purpose of FD IQ compensation is to cancel an image part $s^*(t)$ by adding a compensation factor that contains a scalable $s^*(t)$ term. According to embodiments of the present disclosure, the compensating factor to be added is $$w2(t) * \frac{(z^*(t) + z(t))}{2},$$

and is expressed as Equation (17) below.

$$w2(t) * \frac{(z^*(t) + z(t))}{2} = \quad (17)$$

$$\frac{1}{2}w2(t) * (g_2^*(t) + g_1(t)) * s(t) + \frac{1}{2}w2(t) * (g_1^*(t) + g_2(t)) * s^*(t)$$

With respect to adaptation, the same approximate Newton update may be utilized in the embodiments of the present disclosure. The approximation in Equation (13) forces a scaling factor of the Newton method to be a constant value. Since the only difference between FIG. 2 and FIG. 4 is a scaling term in the Newton update, the approximate Newton update for the embodiment of FIG. 4 is the same as that for FIG. 2, i.e., Equation (13).

Figure 5:
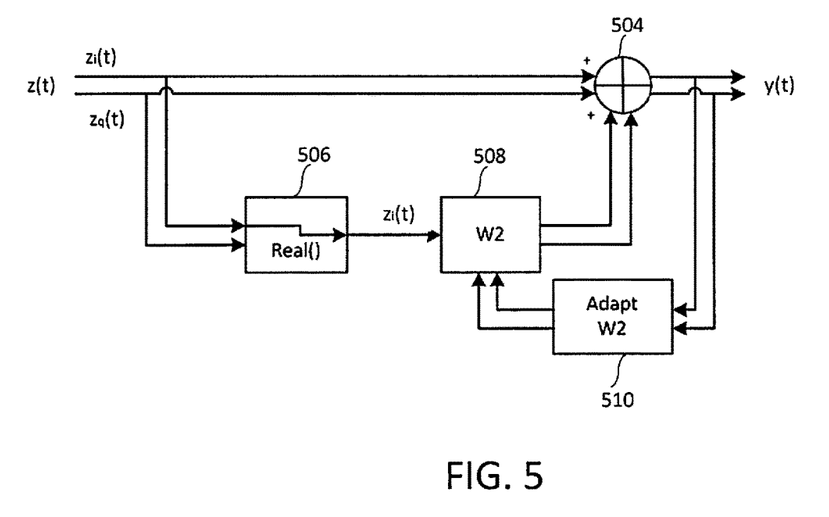
FIG. 5 is a diagram illustrating a filter compensation model with filter adaptation using a real component of a complex signal, according to an embodiment of the present disclosure.

Referring now to FIG. 5, a diagram illustrates a filter compensation model with filter adaptation using a real component of a complex signal, according to an embodiment of the present disclosure. Specifically, the model of FIG. 5 illustrates the model of FIG. 4 in greater detail. The complex baseband signal z(t) from FIG. 1 is provided as input to the filter compensation model as real and imaginary components, $z_i(t)$ and $z_q(t)$, respectively. The components $z_i(t)$ and $z_q(t)$ are provided to both an adder 504 and a selection block 506. The selection block 506 is configured to select the real component $z_i(t)$ and provide the real component $z_i(t)$ to an adaptive filter 508.

The adaptive filter 508 may be a FIR filter, which is a type of discrete-time filter. It may also be implemented as a computer program or an analog filter with analog delay elements replacing registers. The adaptive filter 508 is configured to perform a real multiplication operation using the real component $z_i(t)$ and an adaptive filter coefficient that is outputted by a filter adaptation block 510 to generate a complex compensation signal. The real multiplication operation refers to the real component $z_i(t)$ multiplied by each of a real component and an imaginary component of the adaptive filter coefficient. The real multiplication operation includes two real multiplications that are (1) between I of the adaptive filter coefficient and the real component $z_i(t)$; and (2) between Q of the adaptive filter coefficient and the real component $z_i(t)$.

The adaptive filter 508 provides the complex compensation signal to the adder 504. The adder 504 adds the complex compensation signal to the complex baseband signal z(t), and outputs a compensated signal y(t). The compensated signal y(t) is provided to the filter adaptation block 510, which generates the adaptive filter coefficient that is provided to the adaptive filter 508. The adaptive filter coefficient is used by the adaptive filter 508 to generate the complex compensation signal. Thus, the adaptive filter may be iteratively updated in accordance with Equation (13).

Figure 6:
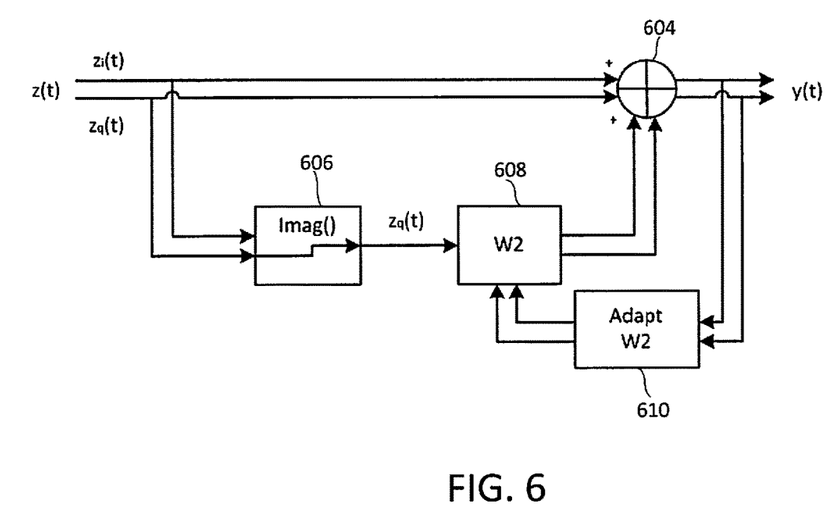
FIG. 6 is a diagram illustrating a filter compensation model with filter adaptation using an imaginary component of a complex signal, according to an embodiment of the present disclosure.

Referring now to FIG. 6, a diagram illustrates a filter compensation model with filter adaptation using an imaginary component of a complex signal, according to an embodiment of the present disclosure. Specifically, the model of FIG. 6 illustrates the model of FIG. 4 in greater detail. The complex baseband signal z(t) from FIG. 1 is provided as input to the filter compensation model as real and imaginary components, $z_i(t)$ and $z_q(t)$, respectively. The components $z_i(t)$ and $z_q(t)$ are provided to both an adder 604 and a selection block 606. The selection block 606 is configured to select the imaginary component $z_q(t)$ and provide the imaginary component $z_q(t)$ to an adaptive filter 608.

The adaptive filter 608 may be an FIR filter, which is a type of discrete-time filter, or computer program or analog filter. The adaptive filter 608 is configured to perform a real multiplication operation using the imaginary component $z_q(t)$ and an adaptive filter coefficient that is outputted by a filter adaptation block 610 to generate a complex compensation signal. The real multiplication operation refers to the imaginary component $z_q(t)$ of the complex baseband signal z(t) multiplied by each of a real component and an imaginary component of the adaptive filter coefficient.

The adaptive filter 608 provides the complex compensation signal to the adder 604. The adder 604 adds the complex compensation signal to the complex baseband signal z(t), and outputs a compensated signal y(t). The compensated signal y(t) is provided to the filter adaptation block 610, which generates the filter coefficient that is provided to the adaptive filter 608. The filter coefficient is used by the adaptive filter 508 to generate the complex compensation signal. Thus, the adaptive filter may be iteratively updated in accordance with Equation (13).

Figure 7:
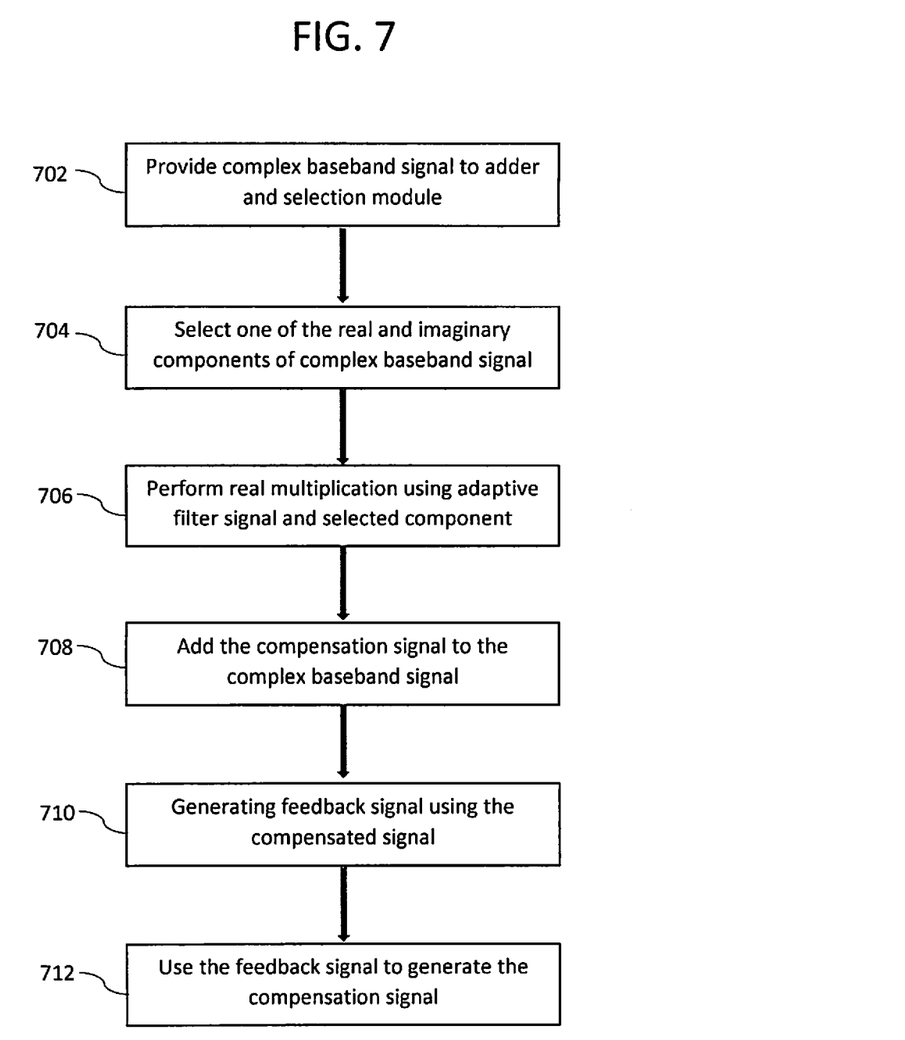
FIG. 7 is a flowchart illustrating a method of filter compensation with filter adaptation, according to an embodiment of the present disclosure.

Referring now to FIG. 7, a flowchart illustrates a method of filter compensation with filter adaptation, according to an embodiment of the present disclosure. The methodology begins at 702, where a complex baseband signal is provided from I and Q paths of a transceiver to an adder and a selection block. At 704, the selection block selects one of the real and imaginary components of the complex baseband signal. At 706, an adaptive filter performs a real multiplication operation using an adaptive filter coefficient that is outputted by a filter adaptation block and the one of the real and imaginary components of the complex baseband signal to generate a complex compensation signal.

At 708, an adder adds the complex compensation signal to the complex baseband signal, and outputs a compensated signal. At 710, a filter adaptation block uses the compensated signal to generate the adaptive filter coefficient that is provided to the adaptive filter. At 712, the adaptive filter coefficient is used by the adaptive filter to generate the complex compensation signal.

Figure 8:
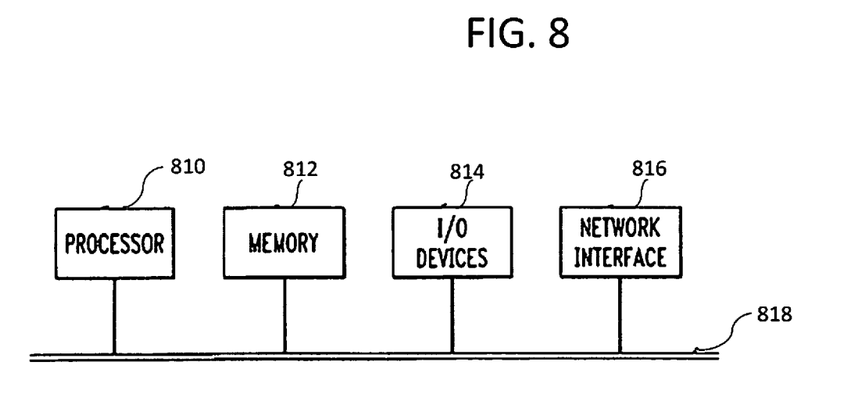
FIG. 8 is a block diagram illustrating an illustrative hardware implementation of a computing system according to an embodiment of the present disclosure.

Referring now to FIG. 8, a block diagram illustrates an illustrative hardware implementation of a computing system in accordance with which one or more components/methodologies of the disclosure (e.g., components/methodologies described in the context of FIGS. 3-7) may be implemented. As shown, the computer system may be implemented in accordance with a processor 810, a memory 812, input/output (I/O) devices 814, and a network interface 816, coupled via a computer bus 818 or alternate connection arrangement.

It is to be appreciated that the term "processor", as used herein, is intended to include any processing device, such as, for example, one that includes, but is not limited to, a central processing unit (CPU) and/or other processing circuitry. It is also to be understood that the term "processor" may refer to more than one processing device and that various elements associated with a processing device may be shared by other processing devices.

The term "memory", as used herein, is intended to include memory associated with a processor or CPU, such as, for example, random access memory (RAM), read only memory (ROM), a fixed memory device (e.g., hard drive), a removable memory device, and flash memory.

In addition, the phrase "input/output devices" or "I/O devices", as used herein, is intended to include, for example, one or more input devices for entering information into the processing unit, and/or one or more output devices for outputting information associated with the processing unit.

Still further, the phrase "network interface", as used herein, is intended to include, for example, one or more transceivers to permit the computer system to communicate with another computer system via an appropriate communications protocol. This may provide access to other computer systems.

Software components, including instructions or code, for performing the methodologies described herein may be stored in one or more of the associated memory devices (e.g., ROM, fixed or removable memory) and, when ready to be utilized, loaded in part or in whole (e.g., into RAM) and executed by a CPU.

Figure 9:
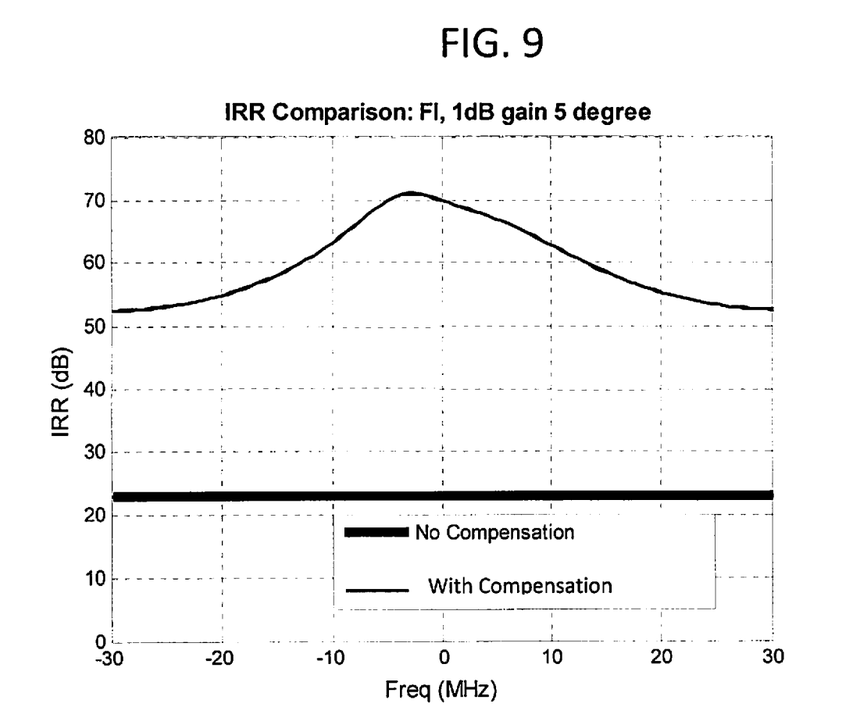
FIG. 9 is a chart showing a comparison of IRRs over a given frequency band, according to an embodiment of the present disclosure.

Referring now to FIG. 9, a chart shows a comparison of IRRs over a given frequency band, according to an embodiment of the present disclosure. Specifically, IRR is measured in an FI system with 1 dB gain mismatch and 5 degree phase mismatch. IRR is measured from a frequency of −30 MHz to 30 MHz. When there is no IQ compensation, the IRR remains constant at approximately 22 dB over the frequency band. When IQ compensation is provided with embodiments of the present disclosure shown and described with respect to FIGS. 4-7, the IRR exceeds 50 dB.

Figure 10:
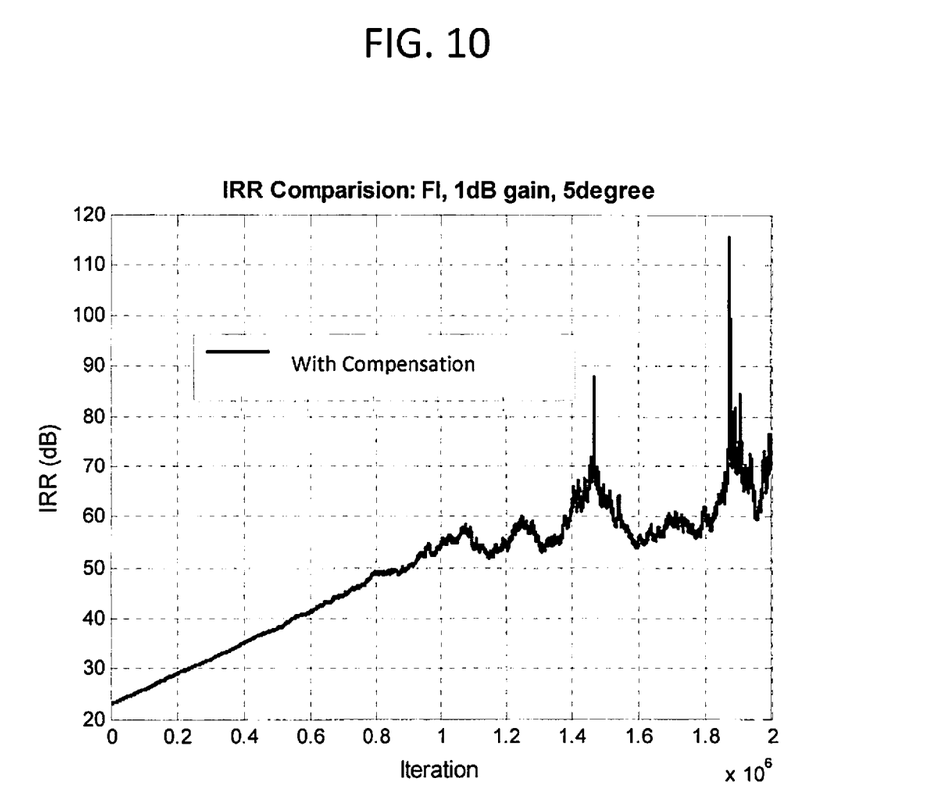
FIG. 10 is a chart showing a comparison of IRRs over a given number of iterations, according to an embodiment of the present disclosure.

Referring now to FIG. 10, a chart shows a comparison of IRRs over a given number of iterations, according to an embodiment of the present disclosure. Specifically, IRR is measured in an FI system with 1 dB gain mismatch and 5 degree phase mismatch. IRR is measured over $2 \times 10^6$ iterations. FIG. 10 shows that IQ compensation with respect to FIGS. 4-7 follow the same track and settle between 60 and 70 dB.

Embodiments of the present disclosure provide a variant of time-domain FD IQ imbalance compensation. Time-domain approaches have an advantage of efficient utilization of a wireless spectrum. However, due to convolution (filtering) operations in the time-domain, even a small number of filter tap operations leads to high hardware complexity and power consumption. Furthermore, due to the nature of blind estimation, high resolution of IQ imbalance estimates are required in order to minimize estimation errors by a long-term average, which leads to an additional increase in complexity. The embodiments of the present disclosure provide an efficient design of time-domain IQ estimation.

The present disclosure may be utilized in conjunction with the manufacture of integrated circuits, which are considered part of the methods and apparatuses described herein.

While the disclosure has been shown and described with reference to certain embodiments thereof, it will be understood by those skilled in the art that various changes in form and detail may be made therein without departing from the spirit and scope of the disclosure as defined by the appended claims and their equivalents.

What is claimed is:

1. A method, comprising:
    selecting, by a processor of a transceiver, one of a real component of a complex signal and an imaginary component of the complex signal;
    performing, by an adaptive filter of the transceiver, a real multiplication operation using an adaptive filter coefficient and the one of the real component and the imaginary component of the complex signal to generate a complex compensation signal; and
    generating a compensated signal based on summing, by an adder of the transceiver, the complex signal and the complex compensation signal,
    wherein a filter adaptation module adapts the adaptive filter coefficient in subsequent iterations using the compensated signal.

2. The method of claim 1, wherein the adaptive filter coefficient and the one of the real component and the imaginary component are real multiplier values.

3. The method of claim 1, wherein the complex signal is a received radio frequency signal having been down-converted through two filters with a 90 degree phase offset for quadrature reception with resulting components having been passed through low-pass filters.

4. The method of claim 1, wherein the real component is an in-phase (I) component of the complex signal and the imaginary component is a quadrature (Q) component of the complex signal.

5. The method of claim 4, wherein the adaptive filter is a finite impulse response (FIR) filter.

6. The method of claim 1, wherein the complex signal has IQ imbalance, and the complex compensated signal corrects the IQ imbalance of the complex signal.

7. The method of claim 1, wherein summing the complex signal and the complex compensation signal cancels an image term of the complex signal using a scalable term in the complex compensation signal.

8. The method of claim 1, wherein the compensated signal is used in transmission or reception IQ imbalance compensation.

9. The method of claim 1, wherein the complex compensation signal is expressed as:

$$w2(t) * \frac{(z^*(t) + z(t))}{2} = \frac{1}{2}w2(t)*(g_2^*(t) + g_1(t))*s(t) + \frac{1}{2}w2(t)*(g_1^*(t) + g_2(t))*s^*(t)$$

where z(t) is the complex signal, z*(t) is a conjugate of z(t), s(t) is a real passband signal, s*(t) is a conjugate of s(t), g(t) is a gain, g*(t) is a conjugate of g(t), and w2(t) is a weight coefficient.

10. An apparatus comprising:
a processor configured to select one of a real component of a complex signal and an imaginary component of the complex signal;
an adaptive filter configured to perform a real multiplication operation using an adaptive filter coefficient and the one of the real component and the imaginary component of the complex signal to generate a complex compensation signal;
an adder configured to sum the complex signal and the complex compensation signal to generate a compensated signal; and
a filter adaptation module configured to adapt the adaptive filter coefficient in subsequent iterations using the compensated signal.

11. The apparatus of claim 10, wherein the adaptive filter coefficient and the one of the real component and the imaginary component are real multiplier values.

12. The apparatus of claim 10, wherein the complex signal is a received radio frequency signal having been down-converted through two filters with a 90 degree phase offset for quadrature reception with resulting components having been passed through low-pass filters.

13. The apparatus of claim 10, wherein the real component is an I component of the complex signal and the imaginary component is the Q component of the complex signal.

14. The apparatus of claim 13, wherein the adaptive filter is a finite impulse response (FIR) filter.

15. The apparatus of claim 10, wherein the complex signal has IQ imbalance, and the complex compensated signal corrects the IQ imbalance of the complex signal.

16. The apparatus of claim 10, wherein summing the complex signal and the complex compensation signal cancels an image term of the complex signal using a scalable term in the complex compensation signal.

17. The apparatus of claim 10, wherein the compensated signal is used in transmission or reception IQ imbalance compensation.

18. The apparatus of claim 10, wherein the complex compensation signal is expressed as:

$$w2(t) * \frac{(z^*(t) + z(t))}{2} = \frac{1}{2}w2(t)*(g_2^*(t) + g_1(t))*s(t) + \frac{1}{2}w2(t)*(g_1^*(t) + g_2(t))*s^*(t)$$

where z(t) is the complex signal, z*(t) is a conjugate of z(t), s(t) is a real passband signal, s*(t) is a conjugate of s(t), g(t) is a gain, g*(t) is a conjugate of g(t), and w2(t) is a weight coefficient.

* * * * *